US012279691B2

(12) United States Patent
Sinkiawic

(10) Patent No.: US 12,279,691 B2
(45) Date of Patent: Apr. 22, 2025

(54) PLANK FINISH APPLICATOR AND METHOD OF USE

(71) Applicant: Jarod Sinkiawic, Rock City, IL (US)

(72) Inventor: Jarod Sinkiawic, Rock City, IL (US)

( * ) Notice: Subject to any disclaimer, the term of this patent is extended or adjusted under 35 U.S.C. 154(b) by 30 days.

(21) Appl. No.: 18/212,277

(22) Filed: Jun. 21, 2023

(65) Prior Publication Data

US 2024/0423352 A1 Dec. 26, 2024

(51) Int. Cl.

| | |
|---|---|
| ***A46B 9/02*** | (2006.01) |
| ***A46B 17/08*** | (2006.01) |
| ***B05C 1/00*** | (2006.01) |
| ***B65D 25/02*** | (2006.01) |
| ***B65D 25/28*** | (2006.01) |
| ***B65D 43/02*** | (2006.01) |

(52) U.S. Cl.

CPC ................ *A46B 9/02* (2013.01); *A46B 9/028* (2013.01); *A46B 17/08* (2013.01); *B05C 1/006* (2013.01); *B65D 25/02* (2013.01); *B65D 25/2867* (2013.01); *B65D 43/0202* (2013.01); *A46B 2200/20* (2013.01); *A46B 2200/202* (2013.01); *B65D 2543/00194* (2013.01); *B65D 2543/00509* (2013.01)

(58) Field of Classification Search

CPC ........... A46B 9/02; A46B 9/028; A46B 17/08; A46B 2200/20; A46B 2200/202; B05C 1/006

USPC ...................................................... 15/DIG. 5

See application file for complete search history.

(56) References Cited

U.S. PATENT DOCUMENTS

| | | | | | |
|---|---|---|---|---|---|
| 1,842,896 | A | | 1/1932 | Clendening | |
| 3,315,296 | A | * | 4/1967 | Richardson .......... | A46B 5/0054 15/159.1 |
| 3,484,888 | A | | 12/1969 | Davis | |
| 3,744,078 | A | * | 7/1973 | Vallis ....................... | A46B 9/02 D4/130 |
| 4,127,911 | A | | 12/1978 | Cupp | |
| 4,255,827 | A | * | 3/1981 | Palazzo .................... | A46B 7/06 15/176.3 |
| D514,816 | S | * | 2/2006 | Clapperton .................... | D4/116 |
| 7,192,210 | B2 | | 3/2007 | Svendsen | |
| 7,284,293 | B1 | * | 10/2007 | Holder ...................... | B08B 1/00 15/210.1 |
| 7,891,041 | B2 | | 2/2011 | Dyer | |
| 7,891,900 | B2 | | 2/2011 | Clarke | |
| D970,139 | S | | 11/2022 | Tyroler | |

(Continued)

FOREIGN PATENT DOCUMENTS

| | | |
|---|---|---|
| CA | 2464610 | 10/2004 |

*Primary Examiner* — Randall E Chin

(57) ABSTRACT

A plank finish applicator assembly for simultaneous application of finish to multiple planks includes a brush head to which a rod is attached. The brush head comprises a plurality of bristles having a plurality of recesses extending into its lower face and between its front and rear edges to define at least two sets of elongate bristles. At least one opposed edge of the plurality of bristles comprises a set of elongate bristles. The recesses and the sets of elongate bristles have widths substantially equivalent to those of a plank in a field of planks and a gap or a channel that is defined by adjacently positioned planks, respectively. The rod is used to dip the bristles into liquid finish and to motivate the brush head across the field to apply the liquid finish to upper and opposed side facets of the planks.

11 Claims, 9 Drawing Sheets

(56) References Cited

U.S. PATENT DOCUMENTS

| | | | | |
|---|---|---|---|---|
| 2005/0086755 | A1* | 4/2005 | Dalias .................... | A46B 9/028<br>15/160 |
| 2013/0298343 | A1* | 11/2013 | Saccoccio ............ | A46B 5/0095<br>15/160 |
| 2014/0310904 | A1 | 10/2014 | Goldstein | |
| 2017/0042320 | A1* | 2/2017 | Potocka ............. | A46B 15/0081 |

* cited by examiner

PLANK FINISH APPLICATOR AND METHOD OF USE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to finish applicators and more particularly pertains to a new finish applicator for simultaneous application of finish to multiple planks. When applying liquid finishes to multiple planks, such as may be used in decking, fencing, or the like, it is difficult to apply the liquid finish to multiple planks at the same time and still achieve liquid finish application to opposed side facets of the planks.

(2) Description of Related Art Including Information Disclosed Under 37 CFR 1.97 and 1.98

The prior art relates to finish applicators and does not teach a finish applicator allowing for simultaneous application of liquid finish to multiple planks that also allows for application of the liquid finish to opposed side facets of the planks.

BRIEF SUMMARY OF THE INVENTION

An embodiment of the disclosure meets the needs presented above by generally comprising a brush head and a rod. The brush head comprises a plurality of bristles, which is attached to and which extends from a lower surface of a plate, which is elongated rectangularly shaped. Each recess of a plurality of recesses extends into a lower face and between a front edge and a rear edge of the plurality of bristles. The recesses define at least two sets of elongate bristles, with at least one opposed edge of the plurality of bristles comprising a set of elongate bristles.

Each recess has a width substantially equivalent to a width of a plank in a field of planks, such as may be used in decking, fencing, or the like. Each set of elongate bristles has a width substantially equivalent to a width of a gap or a channel that is defined by adjacently positioned planks. The rod is attached to and extends angularly from an upper surface of the plate and is configured to be grasped in hands of a user. The user is positioned to dip the plurality of bristles into liquid finish and to motivate the brush head across the field of planks. Each set of elongate bristles travels along a respective gap or a respective channel so that the liquid finish is applied to upper facets and to opposed side facets of the planks over which the plurality of bristles passes.

Another embodiment of the disclosure includes a method of applying liquid finish to a field of planks. The method comprises providing the plank finish applicator assembly, according to the disclosure above. Steps of method include grasping the rod in one's hands, dipping the plurality of bristles into liquid finish, positioning the bristles on the field of planks with each set of elongate bristles in a respective gap or a respective channel, and pulling or pushing on the rod to motivate the brush head across the field so that the liquid finish is applied to the upper facets and the opposed side facets of the planks.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
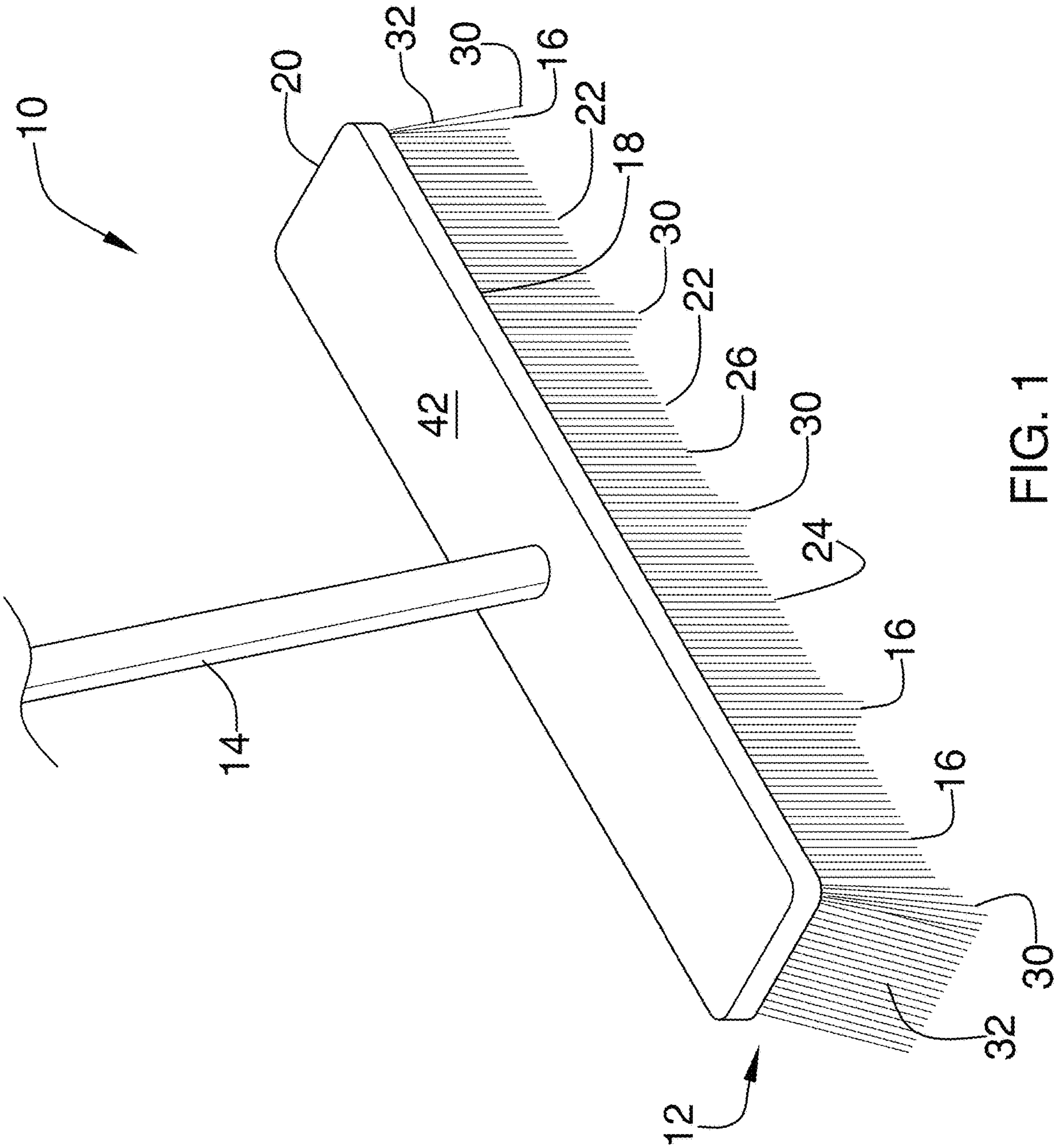
FIG. 1 is a front isometric perspective view of a plank finish applicator assembly according to an embodiment of the disclosure.

With reference now to the drawings, and in particular to FIGS. 1 through 10 thereof, a new finish applicator embodying the principles and concepts of an embodiment of the disclosure and generally designated by the reference numeral 10 will be described.

Figure 2:
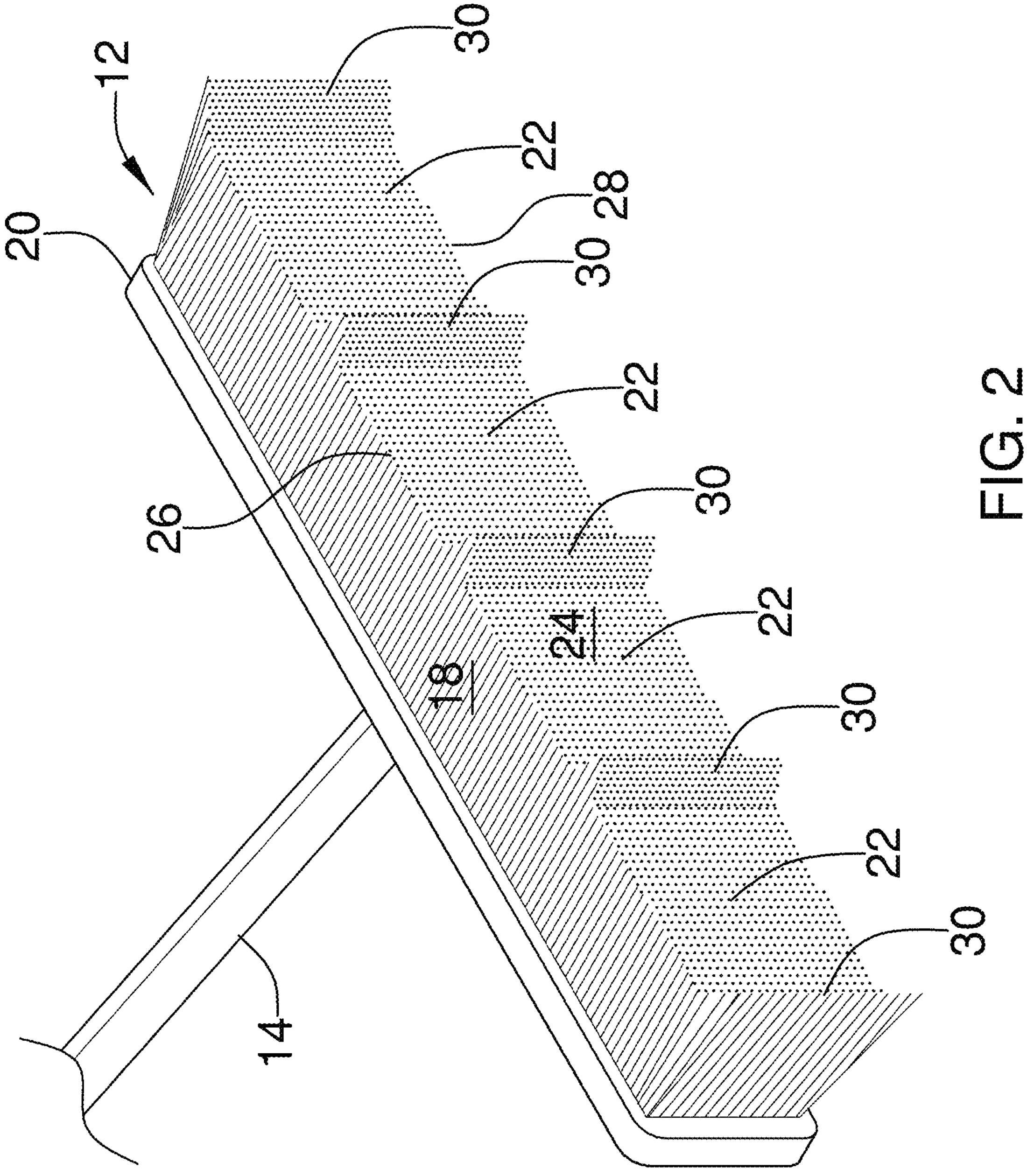
FIG. 2 is a bottom isometric perspective view of an embodiment of the disclosure.
Figure 3:
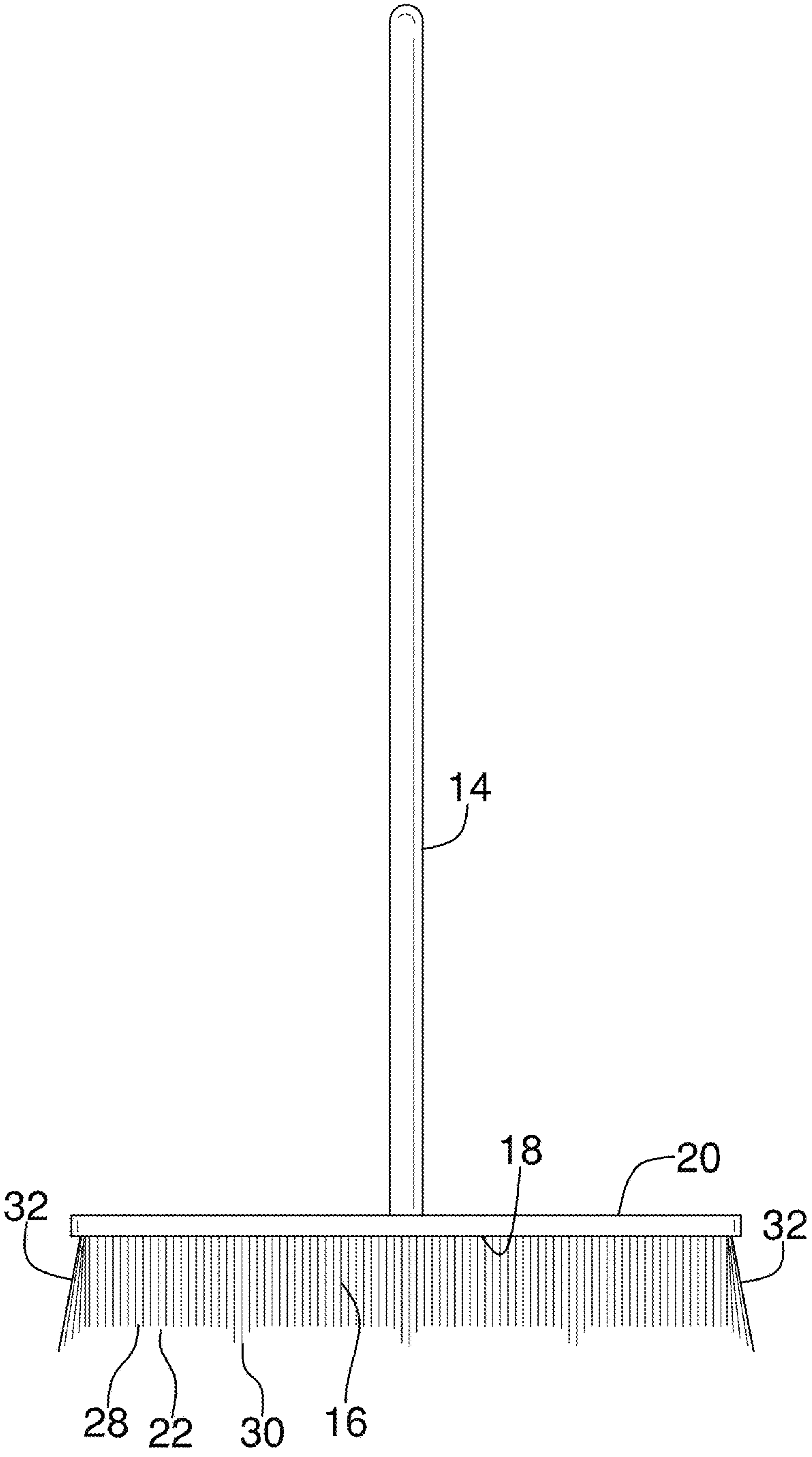
FIG. 3 is a rear view of an embodiment of the disclosure.
Figure 4:
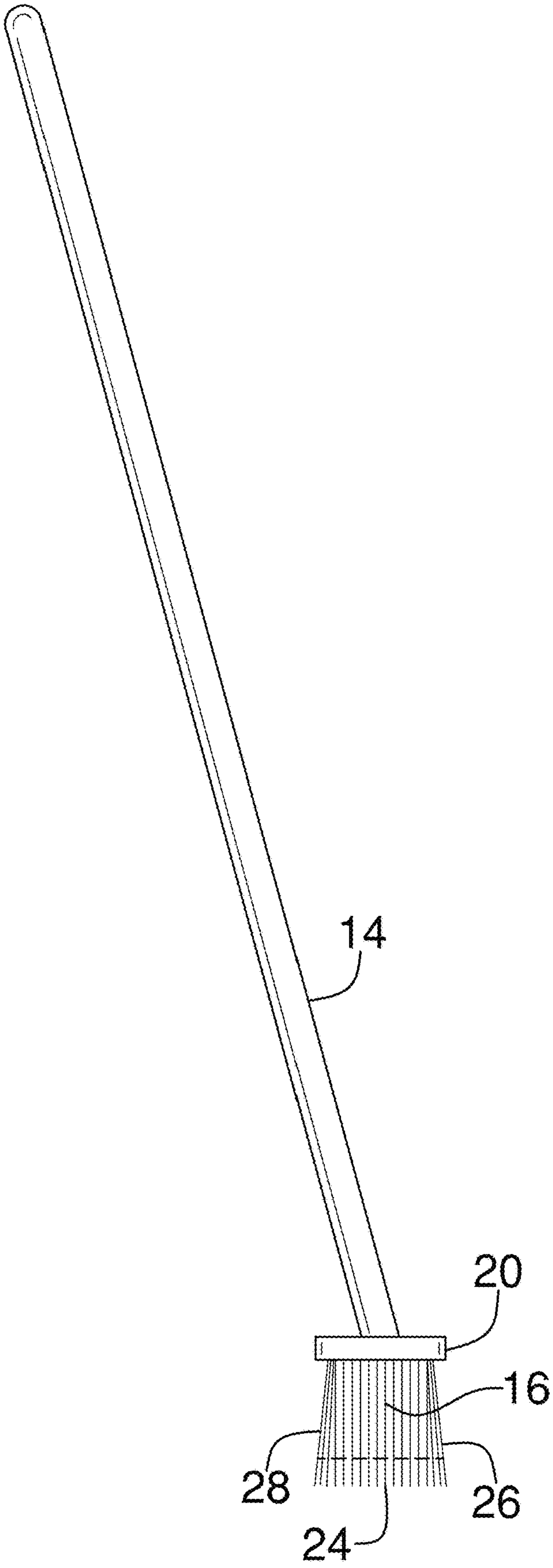
FIG. 4 is a side view of an embodiment of the disclosure.
Figure 5:
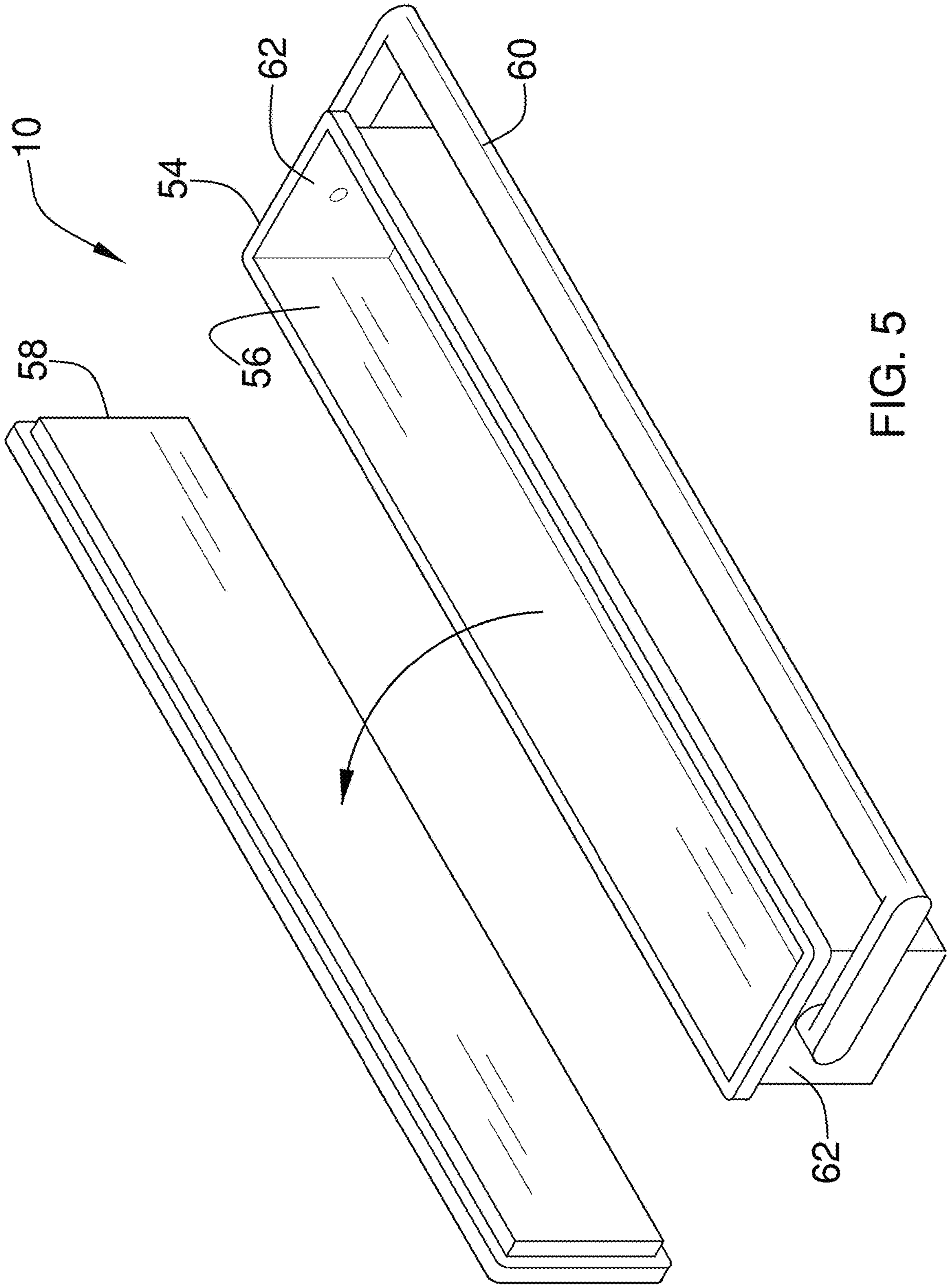
FIG. 5 is a front isometric perspective view of an embodiment of the disclosure.
Figure 6:
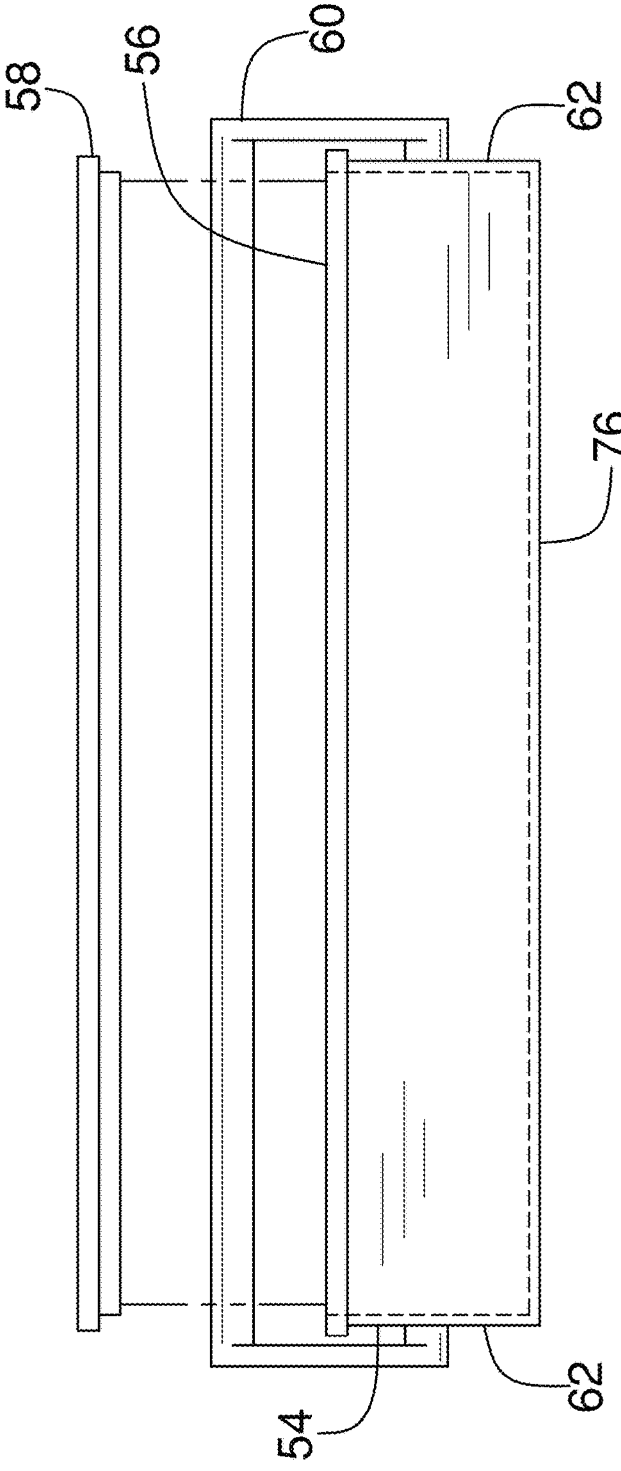
FIG. 6 is a rear view of an embodiment of the disclosure.
Figure 7:
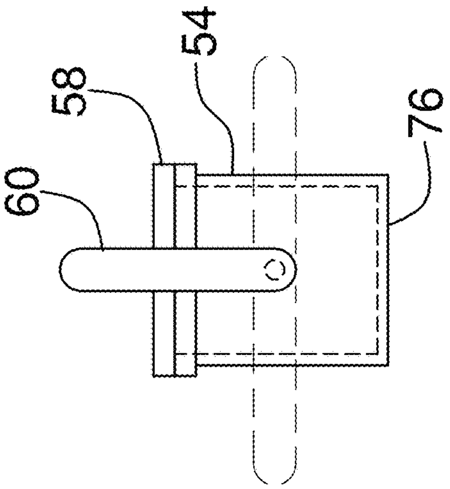
FIG. 7 is a side view of an embodiment of the disclosure.

As best illustrated in FIGS. 1 through 10, the plank finish applicator assembly 10 generally comprises a brush head 12 and a rod 14. The brush head 12 comprises a plurality of bristles 16, which is attached to and which extends from a lower surface 18 of a plate 20, which is elongated rectangularly shaped. As is shown in FIG. 2, each recess 22 of a plurality of recesses 22 extends into a lower face 24 and between a front edge 26 and a rear edge 28 of the plurality of bristles 16. The recesses 22 define at least two sets of elongate bristles 30, with at least one opposed edge 32 of the plurality of bristles 16 comprising a set of elongate bristles 30. Each recess 22 has a width substantially equivalent to a width of a plank 34 in a field of planks 36, such as may be used in decking, fencing, or the like. Each set of elongate bristles 30 has a width substantially equivalent to a width of a gap 38 or a channel 40 that is defined by adjacently positioned planks 34.

The rod 14 is attached to and extends angularly from an upper surface 42 of the plate 20 and is configured to be grasped in hands of a user. The user is positioned to dip the plurality of bristles 16 into liquid finish 44, such as stains, sealants, paints, or the like. The user then can motivate the brush head 12 across the field of planks 36. Each set of elongate bristles 30 travels along a respective gap 38 or a respective channel 40 so that the liquid finish 44 is applied to upper facets 46 and to opposed side facets 48 of the planks 34 over which the plurality of bristles 16 passes.

The plurality of recesses 22 comprises from two to six recesses 22, with each opposed edge 32 of the plurality of bristles 16 comprising a set of elongate bristles 30. The plurality of recesses 22 may comprise from three to five recesses 22, with each opposed edge 32 of the plurality of bristles 16 comprising a set of elongate bristles 30. As is shown in FIG. 2, the plurality of recesses 22 comprises four recesses 22 and each opposed edge 32 of the plurality of bristles 16 comprises a set of elongate bristles 30.

Each elongate bristle 30 of each set of elongate bristles 30 has a respective length so that each set of elongate bristles 30 comprises elongate bristles 30 having a variety of lengths. The set of elongate bristles 30 thus is configured to deliver liquid finish 44 to the opposed side facets 48 of each plank 34 from an upper limit 50 to proximate to a lower limit 52 of the plank 34. Respective elongate bristles 30 of the sets of elongate bristles 30 positioned adjacent to the opposed edges 32 of the plurality of bristles 16 extend angularly from the plate 20 and can deliver liquid finish to the opposed side facets 48 of the planks 34 that bracket the planks 34 over which the plurality of bristles 16 passes.

The plank finish applicator assembly 10 also may comprise a container 54, which has an open top 56 and which is configured to hold the liquid finish 44. The plurality of bristles 16 is insertable into the container 54 to load the brush head 12 with liquid finish 44. A lid 58 is selectively attachable to the container 54 to close the open top 56 and is configured to limit drying of the liquid finish 44 in the container 54. Attachment of the lid 58 allows the user to, for example, take a lunch break without the liquid finish 44 becoming dry and unusable.

A handle 60 is rotatably attached to and extends between opposing ends 62 of the container 54. The handle 60 is configured to be grasped in a hand of the user, enabling the user to lift and to move the container 54.

Figure 8:
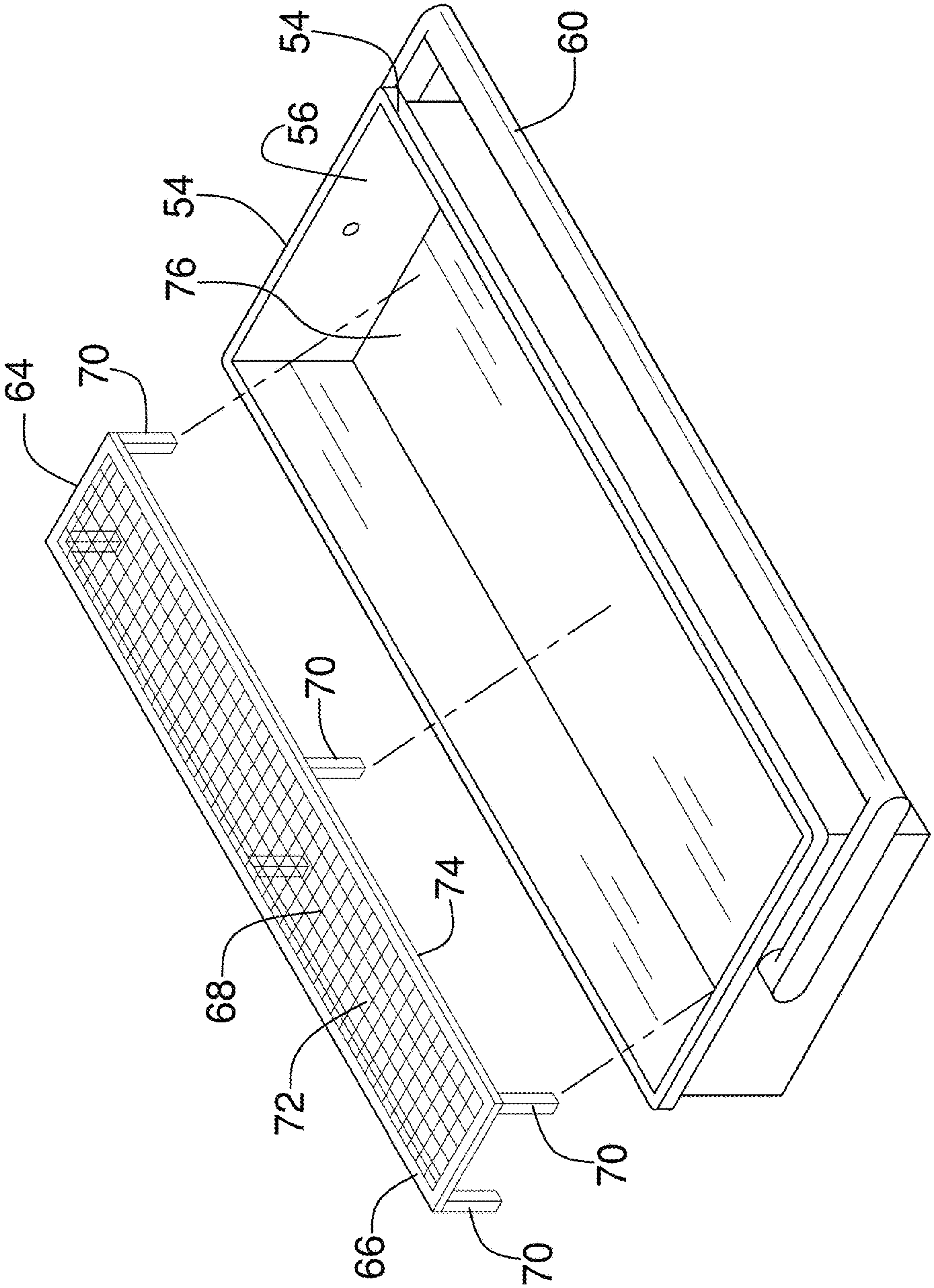
FIG. 8 is an isometric perspective view of an embodiment of the disclosure.
Figure 9:
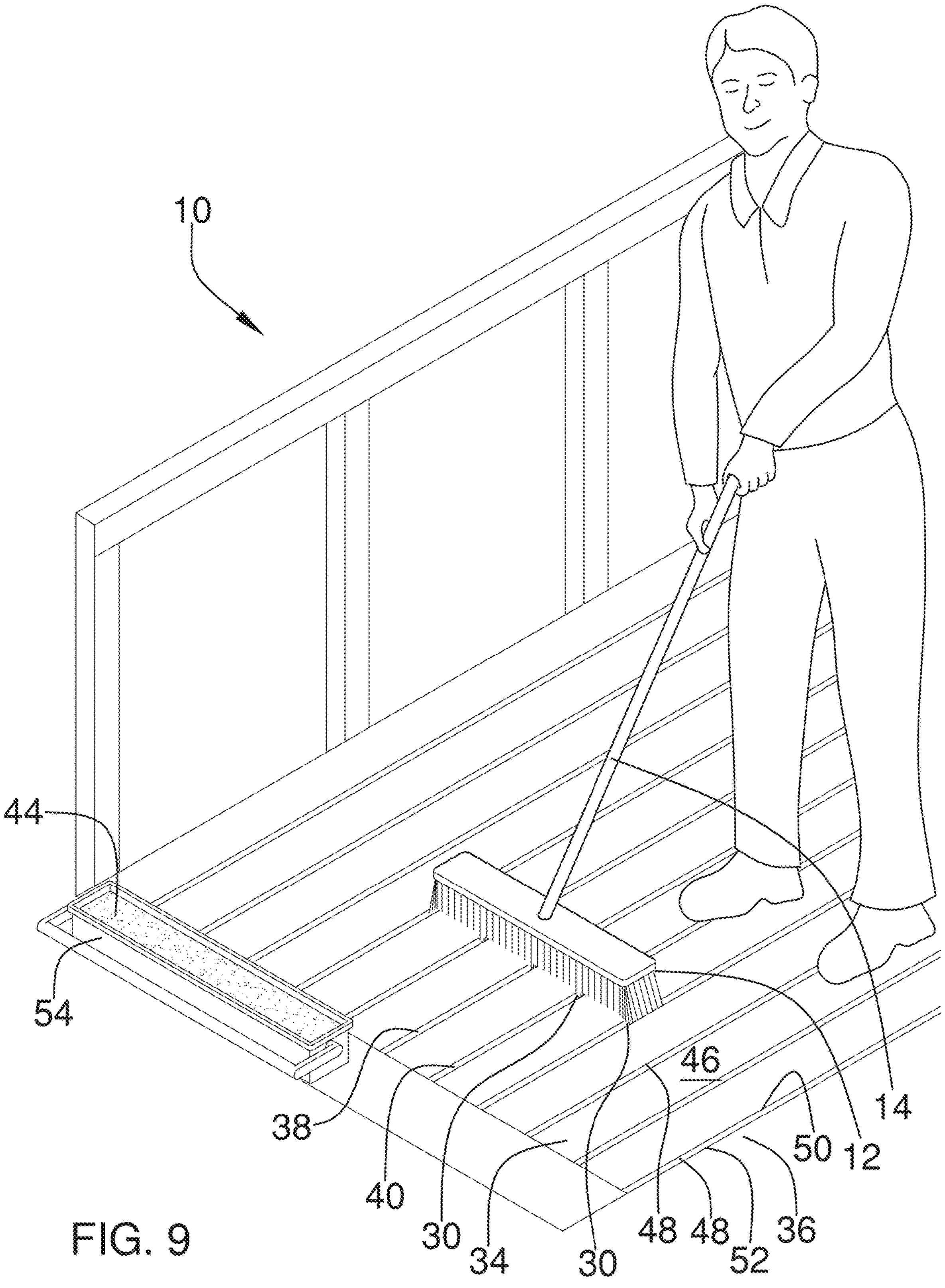
FIG. 9 is an in-use view of an embodiment of the disclosure.
Figure 10:
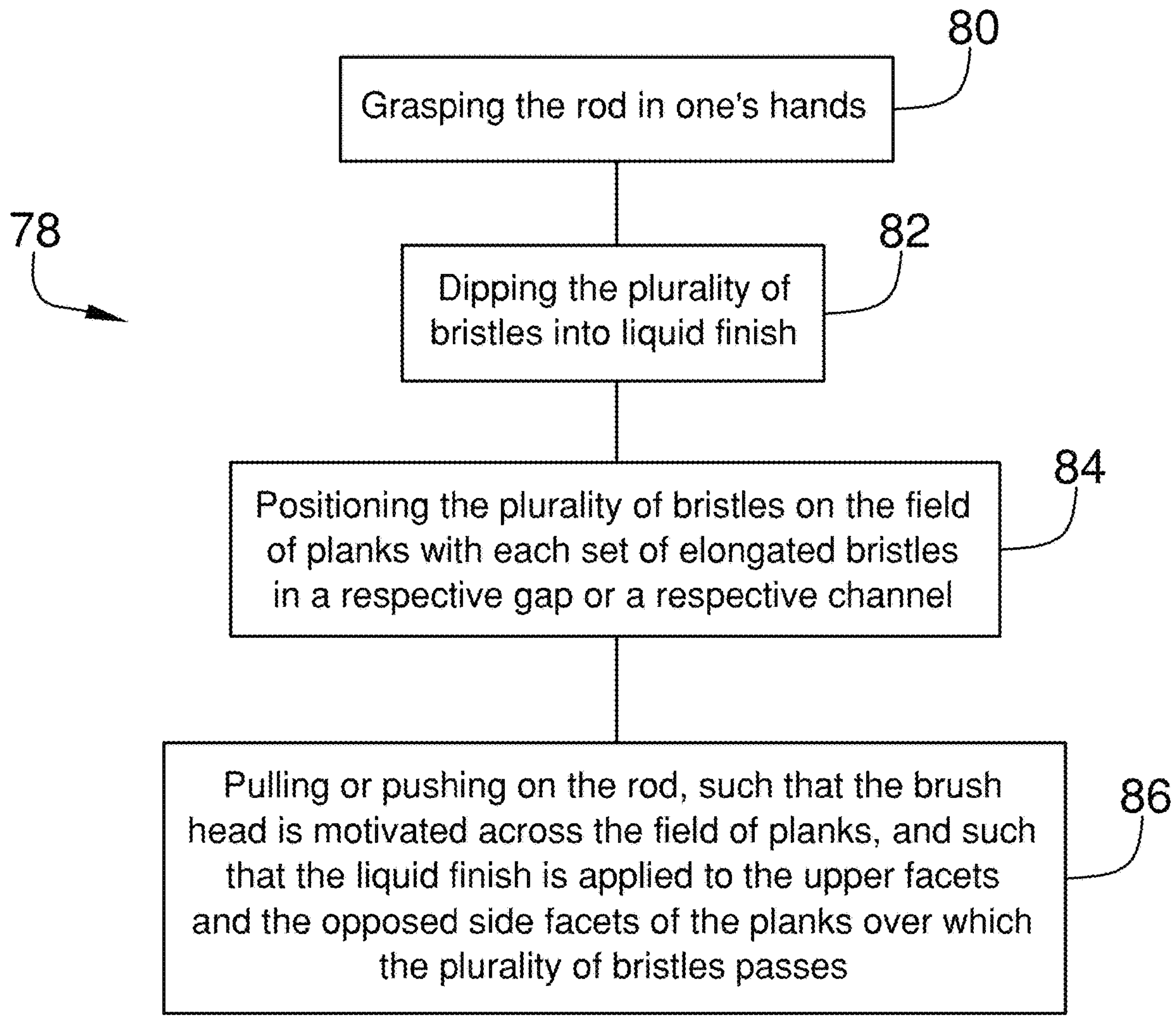
FIG. 10 is a flow diagram for a method utilizing an embodiment of the disclosure.

A screen 64 is selectively positionable in the container 54 so that it is elevated above and substantially parallel to a bottom 76 of the container 54, as is shown in FIG. 8. The brush head 12 is positionable upon the screen 64 to allow drainage of the liquid finish 44 from the plurality of bristles 16. The screen 64 comprises a frame 66, a grid 68, and a plurality of posts 70. The grid 68 is attached to the frame 66 and extends over an area 72 that is defined by the frame 66. The posts 70 are attached to and extend from an underside 74 of the frame 66 to elevate the frame 66 and the grid 68 above the bottom 76 of the container 54.

In use, the plank finish applicator assembly 10 enables a method of applying liquid finish to a field of planks 36. The method 78 comprises providing the plank finish applicator assembly 10, according to the specification above. A first step 80 of the method 78 is grasping the rod 14 in one's hands. A second step 82 of the method 78 is dipping the plurality of bristles 16 into liquid finish 44. A third step 84 of the method 78 is positioning the plurality of bristles 16 on the field of planks 36 with each set of elongate bristles 30 in a respective gap 38 or a respective channel 40. A fourth step 86 of the method 78 is pulling or pushing on the rod 14 so that the brush head 12 is motivated across the field of planks 36, with the liquid finish 44 being applied to the upper facets 46 and the opposed side facets 48 of the planks 34 over which the bristles 16 pass.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A plank finish applicator assembly comprising:

a brush head comprising:

- a plate, the plate being elongated rectangularly shaped;
- a plurality of bristles attached to and extending from a lower surface of the plate; and
- a plurality of recesses, each recess of the plurality of recesses extending into a lower face and between a front edge and a rear edge of the plurality of bristles, such that the plurality of recesses defines at least two sets of elongate bristles with at least one opposed edge of the plurality of bristles comprising a set of elongate bristles, each recess having a width substantially equivalent to a width of a plank in a field of planks and each set of elongate bristles having a width substantially equivalent to a width of a gap or a channel defined by adjacently positioned planks;

a rod attached to and extending angularly from an upper surface of the plate, wherein the rod is configured to be grasped in hands of a user, positioning the user to dip the plurality of bristles into liquid finish and to motivate the brush head across the field of planks with each set of elongate bristles traveling along a respective gap or a respective channel, such that the liquid finish is applied to upper facets and opposed side facets of the planks over which the plurality of bristles passes; and a container having an open top and being configured to hold the liquid finish, such that the plurality of bristles is insertable into the container to load the brush head with liquid finish.

2. The plank finish applicator assembly of claim 1, wherein the plurality of recesses comprises from two to six recesses with each opposed edge of the plurality of bristles comprising a set of elongate bristles.

3. The plank finish applicator assembly of claim 2, wherein the plurality of recesses comprises from three to five recesses with each opposed edge of the plurality of bristles comprising a set of elongate bristles.

4. The plank finish applicator assembly of claim 3, wherein the plurality of recesses comprises four recesses with each opposed edge of the plurality of bristles comprising a set of elongate bristles.

5. The plank finish applicator assembly of claim 1, wherein each elongate bristle of each set of elongate bristles has a respective length, such that each set of elongate bristles comprises elongate bristles having a variety of lengths, such that the set of elongate bristles is configured to deliver liquid finish to the opposed side facets of each plank from an upper limit to proximate to a lower limit of the plank.

6. The plank finish applicator assembly of claim 1, wherein respective elongate bristles of the sets of elongate bristles positioned adjacent to the opposed edges of the plurality of bristles extend angularly from the plate.

7. The plank finish applicator assembly of claim 1, further including a lid selectively attachable to the container to close the open top, wherein the lid is configured to limit drying of the liquid finish in the container.

8. The plank finish applicator assembly of claim 1, further including a handle rotatably attached to and extending between opposing ends of the container, wherein the handle is configured to be grasped in a hand of the user, enabling the user to lift and to move the container.

9. The plank finish applicator assembly of claim 1, further including a screen selectively positionable in the container such that the screen is elevated above and substantially parallel to a bottom of the container, such that the brush head is positionable upon the screen to allow drainage of the liquid finish from the plurality of bristles.

10. The plank finish applicator assembly of claim 9, wherein the screen comprises:

a frame;

a grid attached to the frame and extending over an area defined by the frame; and a plurality of posts attached to and extending from an underside of the frame, such that the plurality of posts elevates the frame and the grid above the bottom of the container.

11. A plank finish applicator assembly comprising:

a brush head comprising:

a plate, the plate being elongated rectangularly shaped;

a plurality of bristles attached to and extending from a lower surface of the plate; and a plurality of recesses, each recess of the plurality of recesses extending into a lower face and between a front edge and a rear edge of the plurality of bristles, such that the plurality of recesses defines at least two sets of elongate bristles with at least one opposed edge of the plurality of bristles comprising a set of elongate bristles, the plurality of recesses comprising four recesses with each opposed edge of the plurality of bristles comprising a set of elongate bristles, each recess having a width substantially equivalent to a width of a plank in a field of planks and each set of elongate bristles having a width substantially equivalent to a width of a gap or a channel defined by adjacently positioned planks;

a rod attached to and extending angularly from an upper surface of the plate, wherein the rod is configured to be grasped in hands of a user, positioning the user to dip the plurality of bristles into liquid finish and to motivate the brush head across the field of planks with each set of elongate bristles traveling along a respective gap or a respective channel, such that the liquid finish is applied to upper facets and opposed side facets of the planks over which the plurality of bristles passes, each elongate bristle of each set of elongate bristles having a respective length, such that each set of elongate bristles comprises elongate bristles having a variety of lengths, such that the set of elongate bristles is configured to deliver liquid finish to the opposed side facets of each plank from an upper limit to proximate to a lower limit of the plank, respective elongate bristles of the sets of elongate bristles positioned adjacent to the opposed edges of the plurality of bristles extending angularly from the plate;

a container having an open top and being configured to hold the liquid finish, such that the plurality of bristles is insertable into the container to load the brush head with liquid finish;

a lid selectively attachable to the container to close the open top, wherein the lid is configured to limit drying of the liquid finish in the container;

a handle rotatably attached to and extending between opposing ends of the container, wherein the handle is configured to be grasped in a hand of the user, enabling the user to lift and to move the container; and a screen selectively positionable in the container such that the screen is elevated above and substantially parallel to a bottom of the container, such that the brush head is positionable upon the screen to allow drainage of the liquid finish from the plurality of bristles, the screen comprising:

a frame;

a grid attached to the frame and extending over an area defined by the frame; and a plurality of posts attached to and extending from an underside of the frame, such that the plurality of posts elevates the frame and the grid above the bottom of the container.

* * * * *